(12) United States Patent
Nakashima

(10) Patent No.: US 10,737,408 B2
(45) Date of Patent: Aug. 11, 2020

(54) PURGING AGENT

(71) Applicant: THE NIPPON SYNTHETIC CHEMICAL INDUSTRY CO., LTD., Osaka (JP)

(72) Inventor: Ayano Nakashima, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 193 days.

(21) Appl. No.: 15/609,176

(22) Filed: May 31, 2017

(65) Prior Publication Data

US 2017/0259463 A1 Sep. 14, 2017

Related U.S. Application Data

(63) Continuation of application No. PCT/JP2015/084153, filed on Dec. 4, 2015.

(30) Foreign Application Priority Data

Dec. 17, 2014 (JP) ................................ 2014-254661

(51) Int. Cl.
| | |
|---|---|
| *B08B 9/00* | (2006.01) |
| *B29C 33/72* | (2006.01) |
| *B29C 48/27* | (2019.01) |
| *C08K 3/26* | (2006.01) |
| *C08K 5/098* | (2006.01) |
| *C08L 23/08* | (2006.01) |
| *B29C 48/92* | (2019.01) |
| *B08B 9/032* | (2006.01) |
| *B29C 45/17* | (2006.01) |
| *C11D 7/24* | (2006.01) |
| *C11D 7/26* | (2006.01) |
| *B29C 48/425* | (2019.01) |
| *B29C 48/10* | (2019.01) |
| *B29C 48/21* | (2019.01) |
| *B29C 48/08* | (2019.01) |

(52) U.S. Cl.
CPC .......... *B29C 33/722* (2013.01); *B08B 9/0321* (2013.01); *B29C 45/1753* (2013.01); *B29C 48/27* (2019.02); *B29C 48/92* (2019.02); *C08K 3/26* (2013.01); *C08K 5/098* (2013.01); *C08L 23/0815* (2013.01); *C11D 7/24* (2013.01); *C11D 7/265* (2013.01); *C11D 7/266* (2013.01); *B29C 48/08* (2019.02); *B29C 48/10* (2019.02); *B29C 48/21* (2019.02); *B29C 48/425* (2019.02); *C08K 2003/267* (2013.01)

(58) Field of Classification Search
CPC ...... C11D 11/0041; C11D 3/37; B08B 7/0071
USPC ........................................................ 510/188
See application file for complete search history.

(56) References Cited

U.S. PATENT DOCUMENTS

| | | | | |
|---|---|---|---|---|
| 5,958,313 A | * | 9/1999 | Yamamoto | .............. C08L 23/06 264/39 |
| 6,294,120 B1 | * | 9/2001 | Negi | ....................... B29C 48/27 264/176.1 |
| 2013/0104937 A1 | | 5/2013 | Kato et al. | |

FOREIGN PATENT DOCUMENTS

| | | |
|---|---|---|
| EP | 0234529 A2 | 9/1987 |
| EP | 0346956 A2 | 12/1989 |
| EP | 0487063 A1 | 5/1992 |
| JP | H8-59905 A | 3/1996 |
| JP | H9-217091 A | 8/1997 |
| JP | H10-000672 A | 1/1998 |
| JP | H10-16023 A | 1/1998 |
| JP | 2000-263625 A | 9/2000 |
| JP | 2008-279623 A | 11/2008 |
| JP | 2009-107160 A | 5/2009 |
| JP | 2011-246609 A | 12/2011 |
| JP | 2012-031404 A | 2/2012 |
| WO | 95/17268 A1 | 6/1995 |

OTHER PUBLICATIONS

European Search Report issued in European Application No. 15869820.9, dated Jul. 6, 2018.
International Search Report from Application No. PCT/JP2015/084153, dated Mar. 8, 2016.
Written Opinion of the International Searching Authority from Application No. PCT/JP2015/084153, dated Jun. 20, 2017.
Chinese Office Action, Chinese Patent Office, Application No. 201580068425.9, dated Aug. 19, 2019, with English machine translation.
Office Action, European Patent Office, Application No. 15869820.9, dated Oct. 17, 2019, 4 pages.
Chinese Office Action, Chinese Patent Office, Patent Application No. 201580068425.9, dated May 15, 2019, with English translation.

(Continued)

*Primary Examiner* — Gregory E Webb
(74) *Attorney, Agent, or Firm* — Greenblum & Bernstein, P.L.C.

(57) ABSTRACT

A purging agent that has excellent purging performance without generation of aggregate is disclosed as a purging agent used in a purging operation where a resin to be processed contains a polar group-containing thermoplastic resin. This purging agent contain a hydrocarbon-based resin, and at least one metal salt among an alkaline metal salt and alkaline earth metal salt, has a water content of 0.15% by weight or less, and includes 0.1 to 20% by weight of the metal salt expressed as the metal relative to the hydrocarbon-based resin.

8 Claims, No Drawings

(56) References Cited

OTHER PUBLICATIONS

Notice of Reasons for Refusal, Japanese Patent Office, Application No. 2015-560448, dated Sep. 20, 2019, with English machine translation.
Decision of Rejection, China Patent Office, Application No. 201580068425.9, dated Feb. 18, 2020, with English translation.

* cited by examiner

PURGING AGENT

CLAIM FOR PRIORITY

This application is a Continuation of PCT/JP2015/084153 filed Dec. 4, 2015, and claims the priority benefit of Japanese application 2014-254661 filed Dec. 17, 2014, the contents of which are expressly incorporated by reference herein in their entireties.

TECHNICAL FIELD

The present invention relates to a purging agent used in purging a molding apparatus for melt-molding thermoplastic resin, in particular, relates to a purging agent useful for removing or cleaning a polar group-containing thermoplastic resin such as saponified ethylene-vinyl ester-based copolymer.

BACKGROUND ART

Polar group-containing thermoplastic resins such as saponified ethylene-vinyl ester-based copolymer (hereinafter, sometimes referred to as "EVOH-based resin"), polyvinyl alcohol-based resin (hereinafter, sometimes referred to as "PVA-based resin"), polyamide-based resin (hereinafter, sometimes referred to as "PA-based resin") and the like are excellent in gas-barrier property and therefore have been utilizing for generally forming into a container or wrapping film for foods by melt-molding.

Since the polar group-containing thermoplastic resin is easy to adhere to the wall of melt flow passageway, in the case of switching from the polar group-containing thermoplastic resin to a new resin as a molding material to be fed into a molding apparatus, the molding apparatus is needed to be clean. Before switching to the new resin, the preceding resin (the polar group-containing thermoplastic resin) which is remaining in the melt flow passageway or adhering to the melt flow passageway should be removed by the use of purging agent.

Also in the case that a polar group-containing thermoplastic resin is continued to be fed to a molding apparatus such as extruder for a long time, a part of the polar group-containing thermoplastic resin stays for a long hours in the passageway of the apparatus. Such stagnation of the resin results in gelation, thermal deterioration or decomposition of the resin, which causes contamination of the resulting molded article. Thus obtained molded article is a defective one with streak or gel, which is a problem.

If such a defective product with streak or gel is extruded from the extruder, the extrusion operation needs to be stopped. In this situation, purging the apparatus of the resin remaining in the passageway or adhering to the wall of the passageway is required as an effective solution of the problem.

As an appropriate purging agent which is effective for removing polar group-containing thermoplastic resin such as EVOH-based resin, there is a known purging agent comprising a hydrocarbon-based resin composition containing a relatively large amount of metal salt such as inorganic salt or organic salt as suggested in, for example, patent document 1.

The document 1 explains that the purging agent can make an excellent cleaning effect due to the fact that the metal salt is transferred from the purging agent to the resin to be removed and brings the resin to decomposition.

Also there is a known purging agent for processing hydrophilic resin such as EVOH-based resin as disclosed in, for example, patent document 2. The purging agent comprises a hydrous resin obtained by adding an appropriate amount of water to thermoplastic resin as a main component.

This purging agent can give water to the hydrophilic resin, thereby the resin is softened and improved in its flowability, and as a result, an excellent cleaning effect may be obtained.

PRIOR ART

Patent Document

[Patent document 1] JP2012-31404A
[Patent document 2] JP2008-279623A

SUMMARY OF THE INVENTION

Technical Problem to be Solved by the Invention

According to the above-mentioned prior arts, a purging agent which water and metal salt are added to hydrocarbon-based resin seems preferable.

However, in the case that hydrocarbon-based resin containing metal salt, in particular the combination of inorganic metal salt and organic salt, and having an increased water content is adopted to purging operation, aggregate has come out in a succeeding resin fed as a molding material. The aggregate results in inferior appearance of a molded article of the succeeding resin, which is problematic.

Therefore, the object of the invention is to provide a purging agent exhibiting an excellent cleaning effect without generation of aggregate.

Means for Solving the Problems

The present inventors has studied the problem about the aggregate and arrived at a conclusion that inorganic salt might be gathered by the assistance of water to generate the aggregate in the extruder during the purging operation. The inventors has also considered that the aggregate might contaminate the resin as extrudate.

Moreover, the inventors have studied purging agent comprising hydrocarbon-based resin and metal salt with relation to types and content of the metal salt and water content therein, and has completed the invention.

The purging agent of the invention comprises a hydrocarbon-based resin, and at least one metal salt selected from the group consisting of alkaline metal salt and alkaline earth metal salt. The purging material has a water content of 0.15% by weight or less. And the content of the metal salt is in the range of 0.1 to 20% in terms of the weight of metal relative to the hydrocarbon-based resin. The purging agent is used for a resin containing a polar group-containing thermoplastic resin to be processed in purging operation.

In another aspect of the invention, the metal salt preferably comprises an inorganic salt and an organic salt. The ratio in weights of the inorganic salt and the organic salt, i.e. inorganic salt/organic salt, is preferably in the range of 0.05 to 10.

In a preferable aspect of the invention, the organic salt is a metal salt of carboxylic acid having from 10 to 25 carbon atoms. Also, preferably the inorganic salt is carbonate.

In a further preferable aspect of the invention, the purging agent is in a pellet form.

The purging agent of the invention is effective in the case of saponified ethylene-vinyl ester-based copolymer resin as the polar group-containing thermoplastic resin to be processed in the purging operation.

Effect of the Invention

According to the invention, a purging agent made of a composition comprising a hydrocarbon-based resin and at least one metal salt selected from the group consisting of alkaline metal salt and alkaline earth metal salt, and having a reduced water content to a specified value can suppress contamination like aggregate. In particular, the purging agent made of the composition containing a relatively high amount of the metal salt can more effectively suppress generation of the aggregate. Furthermore, in the case that the resin to be processed in purging operation is a polar group-containing thermoplastic resin such as EVOH-based resin, excellent purging performance can be exhibited even in a severe situation passing through a narrow and hot passageway like a die or nozzle of a molding apparatus.

MODES FOR CARRYING OUT THE INVENTION

The embodiments of the present invention will be described below, however, the following explanation is about merely typical embodiment, and therefore the invention is not limited to the embodiment.

The purging agent of the invention is used in a purging operation of a molding apparatus such as extruder which is used for melt-molding a polar group-containing thermoplastic resin. During the molding process, the molding apparatus sometimes needs to be cleaned by flowing or removing the resin which stagnates in resin melt flow passageway in the apparatus.

In this description, the temperature of barrel of the extruder indicates the surface temperature of the barrel. In the case that the barrel is divided into some sections each of which is set at an intended temperature different from each other in the extruder, the highest temperature among them is employed for the temperature of the barrel.

<Purging Agent>

Purging agent of the invention is a resin composition or pellets thereof, the resin composition comprising a hydrocarbon-based resin as a base resin, and at least one metal salt selected from alkaline metal salt, alkaline earth metal salt and their combination, and having a water content reduced to a specific amount or less.

<Hydrocarbon-Based Resin>

The hydrocarbon-based resin as a base resin of the purging agent of the invention is a polymer comprising typically 80 mol % or more of hydrocarbon-based monomer unit and having a molecular weight of typically 10000 or more. The main chain of the polymer consists of carbon-carbon bonds.

Since the hydrocarbon-based resin having aforementioned structure has relatively low polarity, the hydrocarbon-based resin is less likely to adhere to a constituent metal of the molding apparatus.

The content of copolymerizable monomer unit other than hydrocarbon-based monomer unit is preferably less than 20 mol % for acquiring exiting property of the purging agent itself.

The normally employed hydrocarbon-based resin in the invention is a polyolefin-based resin and polystyrene-based resin. The former contains an aliphatic hydrocarbon-based monomer unit and the latter contains an aromatic hydrocarbon-based monomer unit as a main repeating unit respectively.

The polyolefin-based resin whose main monomer unit is an aliphatic hydrocarbon-based monomer unit will be described.

Examples of the aliphatic hydrocarbon-based monomers include ethylene, propylene, butene and so on.

The polyolefin-based resin may be homopolymer of aliphatic hydrocarbon-based monomer, random- or block-copolymer of two or more olefin monomers. Examples of the polyolefin-based resin include polyethylene-based resins such as very low density polyethylene, (linear) low density polyethylene, high density polyethylene, as well as ethylene-α olefin copolymer such as ethylene-propylene copolymer, ethylene-octene copolymer, and ethylene-hexene copolymer; polypropylene-based polymers such as polypropylene as well as propylene-α olefin copolymers such as propylene-ethylene copolymer, propylene-butene copolymer; polybutene, polymethylpentene, and so on.

The polystyrene-based resin whose main monomer unit is an aromatic hydrocarbon-based monomer unit will be described.

Examples of the aromatic hydrocarbon-based monomer include specifically styrene, methyl styrene, and so on. The polystyrene-based resin may be a homopolymer of one of those monomers, or a random- or block-copolymer of two or more of them.

From the points of exiting property of purging agent itself and economic advantages, preferable hydrocarbon-based resin is a polyolefin-based resin, more preferable one is polyethylene-based resin or polypropylene-based resin, furthermore preferable one is polyethylene-based resin, and particularly preferable one is low density polyethylene, especially linear low density polyethylene.

The content of hydrocarbon-based resin in the purging agent of the present invention is usually 80% by weight or more, preferably 85% by weight or more but not exceed 99.9% by weight.

<Metal Salt>

The metal salt contained in the purging agent of the present invention is at least one selected from the group consisting of alkaline metal salt, alkaline earth metal salt, and a combination of them. In other words, the purging agent contains alkaline metal salt, alkaline earth metal salt, or a mixture of alkaline metal salt and alkaline earth metal salt. The content of the metal salt is from 0.1 to 20% by weight, preferably 0.2 to 10% by weight, particularly preferably exceeding 1 but not exceeding 3% by weight as a content of metal per hydrocarbon-based resin. If the content of metal salt relative to the base resin is too high, discharging the purging agent itself from the molding apparatus by using another resin might become difficult. If the content of metal salt relative to base resin is too low, the resin melt flow passageway of the molding apparatus might not be sufficiently cleaned.

Alkali metal or alkaline earth metal of the metal salt has a function of decomposing a resin to be processed in the purging operation. Specific examples of the alkali metal include lithium, sodium, potassium, rubidium, and cesium. Specific examples of the alkaline earth metal include beryllium, magnesium, calcium, strontium, and barium. Among them, alkaline earth metal is preferable, magnesium and calcium is particularly preferable, because of easy availability, economical advantage and higher purging performance.

The metal salt of alkali metal or alkaline earth metal may be an organic or inorganic salt of them. A low-molecular metal salt is preferable due to its dispersibility in resin composition.

A preferable organic salt is a salt of carboxylic acid such as, for example, acetic acid, oxalic acid, lauric acid, myristic acid, palmitic acid, stearic acid, arachic acid, heptadecylic acid, behenic acid, oleic acid, elaidic acid, erucic acid, linoleic acid, linolenic acid, ricinolic acid, hydroxy stearic acid, montanic acid, isostearic acid, and epoxy stearic acid.

Among them, metal salt of long-chain aliphatic carboxylic acid having relatively many carbon atoms is preferable due to surface activity of the long-chain aliphatic carboxylic acid. By the surface activity of the long-chain aliphatic carboxylic acid, it is expected that the resin attached to wall of the molten resin flow passageway is floated from the metallic wall and removed therefrom.

As the long-chain aliphatic carboxylate, carboxylate having from 10 to 25 carbon atoms is preferable, carboxylate having from 12 to 22 carbon atoms is more preferable, and carboxylate from 14 to 20 is particularly preferable. Aliphatic carboxylate having unduly high number of carbon atoms tends to become difficulty in commercial availability. And aliphatic carboxylate having unduly low number of carbon atoms tends to lower purging performance due to its poor surface activity of the purging agent when being molten.

Accordingly, a preferable metal salt of organic acid is an alkaline earth metal salt of carboxylic acid having from 14 to 20 carbon atoms, most preferable one is magnesium salt of carboxylic acid having from 14 to 20 carbon atoms.

Such metal salt of organic acid has a melting point of usually 100 to 220° C. preferably 110 to 180° C. particularly preferably 120 to 160° C. Such metal salt of organic acid can be molten to act as a surfactant during purging operation, which is preferable.

A preferable metal salt of inorganic acid is a metal salt supplying an anion deriving from the inorganic acid, and may be, for example, borate, phosphate, carbonate, sulfate and so on. Among them, a basic inorganic salt is preferable and carbonate is particularly preferable, because they can degrade EVOH-based resin to highly clean the resin melt flow passageway.

In particular, magnesium carbonate can exist stably as a state of basic magnesium carbonate, which is commercially available. Therefore the magnesium carbonate is preferable.

Inorganic salt has commonly a melting point of usually 500° C. or more, which is much higher than a typical melt-molding temperature of thermoplastic resin, and therefore the inorganic salt is not molten in resin melt flow passageway. For this reason, it is expected that the inorganic metal salt can peel off the resin from the inside wall of resin melt flow passageway by friction against the resin.

It is preferable that the constituent metal salt of the purging agent of the invention has a relatively smaller particle diameter because of moldability of the purging agent pellets and avoidance of its stagnation in a molding apparatus. Preferable average particle diameter of the metal salt is normally 20 μm or less, wherein the particle diameter is a measurement value according to a laser diffraction/scattering method.

Concurrent use of the organic salt and inorganic salt is preferable as the metal salt contained in the purging agent of the invention. The weight ratio of inorganic salt to organic salt is in the range of usually 0.05 to 10, preferably 0.1 to 8, more preferably 0.2 to 5, particularly preferably 1 to 1.5.

The kinds of metal may be the same or different between the inorganic salt and the organic salt. Preferably the same metal is employed between them because of better exiting property of the purging agent.

Taking account of their economic efficiency and productivity, and cleaning effect, the combination of a carbonate as an inorganic salt and a long-chain aliphatic carboxylate as an organic salt is preferable.

Most preferable combination is magnesium carbonate and magnesium carboxylate having 14 to 20 carbon atoms.

The concurrent use of the inorganic salt and organic salt as the metal salt can provide excellent cleaning effect for the following reasons. In the case of the concurrent use, the resin adhering to the wall can be removed in a synergetic effective manner because the organic salt can make the resin peel off easier and the inorganic salt can peel off the resin from the wall. In addition to the above synergetic effect, the primary action of the metal salt. i.e. decomposition of the resin to be processed in the purging operation, can be also obtained. As a result, high cleaning effect can be achieved.

<Another Component>

The purging agent of the invention may optionally contain a thermal stabilizer such as hindered phenols or hindered amines, silicon-based or fluorine-based fatty acid ester, amide-based lubricant, foaming agent, filler (metal oxide or metal hydroxide etc.), in the amount of typically less than 3%, preferably less than 1% by weight based on the total weight of the purging agent.

<Water Content of Purging Agent>

According to the patent document 2 mentioned earlier, it is considered that the higher water content the purging agent used for hydrophilic resin such as EVOH-based resin has, the larger the cleaning effect of the purging agent would be, because the purging agent can give moisture to the resin to be processed to soften and improve the fluidity of the resin. Also, it is considered, according to the document 2, that a purging agent having relatively high water content would be advantageous in productivity of pellets of the purging agent because sufficiently water-cooled purging agent could be cut effectively in its pelletizing process. However, the pellets of the purging agent of the invention has a lower water content than a typical one, which is a unique feature.

The water content of the purging agent is in the range of 0.15% by weight or less, preferably 0.12% by weight or less, particularly preferably 0.10% by weight or less. Unduly high water content provides the following drawbacks. The inorganic metal salt is likely to clump together again in the presence of water and causes inferior appearance of a molded article obtained after the purging operation. When it comes to pelletization process of the purging agent, cutting operation by a pelletizer becomes difficult because bubble release occurs in resin melt after compounded in the extruder. Even if the resin melt can be cut, the produced pellets have defective shape, resulting in regrading productivity. As an additional disadvantage, thus produced pellets each has pores derived from bubbles generated in the pelletizing process and is brittle due to the pores. Probably such brittle pellets of the purging agent can raise a problem such as feeding trouble of the purging agent in a purging operation of an extruder because the brittle pellets are easily to crush in hopper when feeding. Accordingly the lower water content is preferable, however, reduction of the water content down to 0.001% by weight or less is usually difficult in their production.

The above-mentioned water content of the purging agent can be determined by weighing the purging agent after the heat treatment and calculating with the weight described below.

<Measuring Method>

Purging agent (weight: P1=10 g) is put in an aluminum cup and weighed. The weight of the aluminum cup itself is represented by C1, and the weight of aluminum cup containing purging agent is represented by (C1+P1). The aluminum cup containing purging agent is heated at 105° C. for 2 hours in a desiccator "SAFETY OVEN SPH-100" (ESPEC CORP.). The desiccator is used without replacing air with nitrogen and vacuuming. After the heat treatment, the aluminum cup is drawn from the desiccator and then left to stand for 30 minutes in another desiccator where desiccant agent is set, as a result, the purging agent is cooled down to the room temperature. The aluminum cup containing the heat-treated purging agent (weight: P2) has a weight represented by (C1+P2), which is weighed. The water content (% by weight) is calculated according to the following formula with the obtained weight (C1+P2).

$$\text{Water content(\% by weight)} = \frac{(C1+P1)-(C1+P2)}{(C1+P1)-C1} \times 100 = \frac{P1-P2}{P1} \times 100 \qquad \text{[Formula 1]}$$

<Preparation Method for Purging Agent>

A purging agent of the invention is prepared by blending an appropriate amount of at least one metal salt from the group consisting of alkaline metal salt and alkaline earth metal salt with a hydrocarbon-based resin as base resin, and compounding them.

A known compounding method may be employed for the preparation of the purging agent. Compounding process may be carried out preferably with use of extruder from the viewpoint of processability and economic efficiency. The type of extruders is not particularly limited, however, a conventional extruder such as single screw extruder, twin screw extruder, or multi-screw extruder may be used.

When compounding with an extruder, the barrel temperature of the extruder is in the range of usually 150 to 300° C. preferably 160 to 280° C., particularly preferably 170 to 250° C.

Preferably, the metal salt contained in the purging agent is homogenously dispersed in hydrocarbon-based resin as a base resin. Taking account of the balance between dispersibility and thermal deterioration due to shear heating, compounding process with twin screw extruder is preferable.

In pelletization of the purging agent of the invention, pelletizing process is preferably carried out after compounding in the above mentioned manner.

A known pelletization technique may be adopted. According to typical pelletization, resin melt obtained after compounding is extruded in strand form into water and water-cooled strand is cut to provide pellets. The cutting operation in the pelletization is generally conducted after sufficiently water-cooling the strand for the reasons of (1) and (2) described below.

(1) Short distance for water-cooling process causes insufficiently cooled strand, which may trouble in cutting strand with pelletizer to produce pellets with cutting defect.

(2) Strand can twine around a rotating cutter of pelletizer, debris generated when cutting strand by pelletizer is piled in the pelletizer and interfere with the rotation of rotating cutter. These troubles cause the pelletizer to interrupt the cutting operation.

Thus produced pellets have commonly spherical, columnar, cubic, or cuboidal shape. Preferable shape of the pellets is column, commonly with diameter of 1 to 5 mm and height of 1 to 5 mm.

Thus produced pellets have commonly a water content of 0.2 to 0.3% by weight, which should be reduced in order to produce the purging agent of the invention. Any known methods for reducing water content of the pellets may be adopted. Examples of the methods include (1) preventing moisture absorption by preserving raw material of the pellets in a moisture-proof bag; (2) drying hygroscopic raw material prior to use; (3) vacuuming with vent in compounding process; (4) elevating temperature of the resin when compounding; (5) shortening water-cooling distance of resin melt in pelletizing process after compounding process; (6) adjusting water-cooling temperature; (7) drying the purging agent as a post-treatment; (8) preserving the purging agent in moisture-proof bag; and (9) appropriate combination of these methods. Of these methods, (5) is preferable because additional processes are not required for the preparation method of pellets, which is economic advantage.

<Resin to be Processed in Purging Operation>

The resin to be processed in purging operation with the purging agent of the invention comprises a polar group-containing thermoplastic resin. Examples of the polar group-containing thermoplastic resin include vinyl alcohol resin such as EVOH-based and PVA-based resin, PA-based resin, and so on. The resin to be processed may be a polar group-containing thermoplastic resin alone as well as a mixed resin containing 1% by weight or more (preferably 5% by weight or more) of polar group-containing thermoplastic resin.

Such resin, in particular EVOH-based resin, is easy to adhere to metallic wall of a molding apparatus, but is hard to be peeled off from the wall. Therefore the purging agent of the invention is useful for removing such resin from the wall.

The EVOH-based resin as a typical example of the resin to be processed is a hydrophilic, water-soluble thermoplastic resin, which is produced commonly by copolymerizing ethylene and vinyl ester-based monomer, and saponifying the obtained copolymer. Any known copolymerization technique such as solution polymerization, suspension polymerization, or emulsion polymerization may be adopted. As a typical copolymerization technique, solution polymerization with use of methanol as a solvent is adopted. The obtained ethylene-vinyl ester copolymer may be saponified by a known saponification method. The EVOH-based resin contains ethylene unit and vinyl alcohol structural unit as main units, and also contain a bit of vinyl ester structural unit as a remaining unsaponified unit.

A typical vinyl ester-based monomer is vinyl acetate because of easy commercial availability and better efficiency in removing impurity. Besides vinyl acetate, aliphatic vinyl ester such as vinyl formate, vinyl propionate, vinyl valerate, vinyl butyrate, vinyl isobutyrate, vinyl pivalate, vinyl caprate, vinyl laurate, vinyl stearate, or vinyl versatate; or aromatic vinyl ester such as vinyl benzoate may be used as the vinyl ester-based monomer. Aliphatic vinyl ester having carbon atoms from usually 3 to 20, preferably 4 to 10, more preferably 4 to 7. These vinyl ester monomers may be used alone, but a combination of these may also be used if necessary.

The content of ethylene unit of the EVOH-based resin is in the range of usually 20 to 60 mol %, preferably 25 to 50 mol %, and particularly preferably 25 to 35 mol %. The content of ethylene unit is a measurement value according to ISO14663. In the case that the ethylene unit is unduly low, gas-barrier property in a high humidity condition and melt-molding property tends to be lowered. In the case that the ethylene unit is unduly high, gas-barrier property tends to be lowered.

Saponification degree of vinyl ester component of EVOH-based resin is in the range of usually 90 to 100 mol %, preferably 95 to 100 mol %, particularly preferably 99 to 99.9 mol %, which is a measurement value in accordance with JIS K6726 with the proviso that a solution in which EVOH-based resin is dissolved in water/methanol solvent is measured. In the case that the saponification degree is unduly low, gas-barrier property, thermal stability, and humidity resistance tend to be lowered.

The EVOH-based resin has a melt flow rate (MFR) (210° C., load of 2,160 g), which is measured with a melt indexer (or extrusion type plastometer), is in the range of usually 0.5 to 100 g/10 min., preferably 1 to 50 g/10 min., particularly preferably 3 to 35 g/10 min. Unduly high MFR may result in unstable film productivity. Unduly low MFR provides resin melt having too high viscosity, which may become difficult in melt-extrusion process.

The EVOH-based resin used in the invention may further contain a structural unit derived from the following comonomer within the amount not inhibiting the effect of the invention, for example 10 mol % or less.

Examples of the comonomer include olefins such as propylene, I-butene and isobutene; hydroxy group-containing α-olefins such as 3-buten-1-ol, 3-butene-1,2-diol, 4-penten-1-ol, and 5-hexene-1,2-diol, or derivatives of ester or acylate thereof; unsaturated acids such as acrylic acid, methacrylic acid, crotonic acid, phthalic acid (or phthalic anhydride), maleic acid (or maleic anhydride), and itaconic acid (or itaconic anhydride) or salt thereof, or mono- or di-alkyl ester having from 1 to 18 carbon atoms; acrylamides such as acrylamide. N-alkyl (having from 1 to 18 carbon atoms) acrylamide, N,N-dimethylacrylamide, 2-acrylamide propanesulfonic acid or its salt, and acrylamide propyl dimethylamine or its acid salt or quaternary salt thereof; methacrylamides such as methacrylamide, N-alkyl (having from 1 to 18 carbon atoms) methacrylamide. N,N-dimethylmethacrylamide, 2-methacrylamide propanesulfonic acid or salt thereof, methacrylamide propyl dimethylamine or acid salt thereof or quaternary salt thereof; N-vinylamides such as N-vinylpyrrolidone. N-vinylformamide, and N-vinylacetamide; vinyl cyanides such as acrylonitrile and methacrylonitrile; vinyl ethers such as alkyl (having from 1 to 18 carbon atoms) vinyl ether, hydroxy alkyl vinyl ether, and alkoxyalkyl vinyl ether, vinyl halides such as vinyl chloride, vinylidene chloride, vinyl fluoride, vinylidene fluoride, and vinyl bromide; vinylsilanes such as trimethoxyvinylsilane; allyl halides such as allyl acetate and allyl chloride; allyl alcohols such as allyl alcohol and dimethoxy allyl alcohol; trimethyl-(3-acrylamide-3-dimethylpropyl)-ammonium chloride, acrylamide-2-methylpropanesulfonic acid, and so on.

Also, "post-modified" such as urethanated, acetalized, cyanoethylated, or oxyalkylenated EVOH-based resin may be used.

EVOH-based resin modified by copolymerizing hydroxy group-containing α-olefin is particularly preferred because of improving post-formability. Especially, EVOH-based resin modified with 1,2-diol at side chain thereof is preferable.

The EVOH-based resin modified with 1,2-diol at side chain thereof is an EVOH-based resin containing 1,2-diol structural unit at side chain thereof, which is represented by the structural unit (1) shown below.

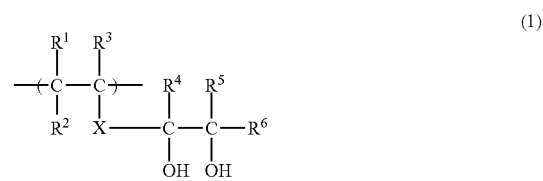

In the general formula (1), each of $R^1$, $R^2$, and $R^3$ is independently hydrogen atom or an organic group, and X is single bond or binding chain, each of $R^4$, $R^5$, and $R^6$ is independently hydrogen atom or an organic group.

Organic group contained in the 1,2-diol structural unit represented by the general formula (1) is not particularly limited. Examples of the organic group include saturated hydrocarbon group such as methyl, ethyl, n-propyl, isopropyl, n-butyl, isobutyl, and tert-butyl; aromatic hydrocarbon group such as phenyl, benzyl, halogen, hydroxyl, acyloxy, alkoxycarbonyl, carboxyl group, and sulfonic acid.

Any of $R^1$-$R^3$ is preferably hydrogen atom or a saturated hydrocarbon group having from usually 1 to 30 carbon atoms, preferably 1 to 15 carbon atoms, more preferably 1 to 4 carbon atoms. Hydrogen is most preferable.

Any of $R^4$-$R^6$ is preferably hydrogen atom or a saturated hydrocarbon group having from usually 1 to 30 carbon atoms, preferably 1 to 15 carbon atoms, more preferably 1 to 4 carbon atoms. Hydrogen is most preferable. In particular, it is most preferable that all of $R^1$ to $R^6$ are hydrogen atoms X in the structural unit represented by the formula (1) is typically single bond, or may be a binding chain. The binding chain is not limited to, but may be hydrocarbon chain such as alkylene, alkenylene, alkynylene, phenylene, and naphthylene (in which a hydrogen may be substituted by halogen such as fluorine, chlorine, or bromine); ether bond-containing group such as —O—, —(CH$_2$O)$_m$—, —(OCH$_2$)$_m$—, and —(CH$_2$O)$_m$CH$_2$—; carbonyl-containing group such as —CO—, —COCO—, —CO(CH$_2$)$_m$CO—, and —CO(C$_6$H$_4$)CO—; hetero atom-containing group such as sulfur-containing group (e.g. —S—, —CS—, —SO—, and —SO$_2$—), nitrogen-containing group (e.g. —NR—, —CONR—, —NRCO—, —CSNR—, —NRCS—, and —NRNR—), phosphorus-containing group (e.g. —HPO$_4$—); metal atom-containing group such as silicon-containing group (e.g. —Si(OR)$_2$—, —OSi(OR)$_2$—, and —OSi(OR)$_2$O—), titanium-containing group (e.g. —Ti(OR)$_2$—, —OTi(OR)$_2$—, and —OTi(OR)$_2$O—), aluminum-containing group (e.g. —Al(OR)—, —OAl(OR)—, and —OAl(OR)O—), and so on. R in these binding chain is independently an intended substituting group, and preferably hydrogen atom or an alkyl group, and m is a natural number, usually selected from the range of 1 to 30, preferably 1 to 15, more preferably 1 to 10. Among them, from the point of stability in production and usage, —CH$_2$OCH$_2$—, and a hydrocarbon chain having from 1 to 10 carbon atoms (preferably from 1 to 6 carbon atoms, more preferably 1) is preferred.

In particular, in the case of EVOH-based resin containing 1,2-diol structural unit represented by the formula (1), the content of the 1,2-diol structural unit is in the range of usually 0.1 to 20 mol %, preferably 0.1 to 15 mol %, more preferably 0.1 to 10 mol %.

The resin to be processed may contain, besides polar group-containing thermoplastic resin such as EVOH-based resin, a known thermoplastic resin having a melting point (or flow initiation temperature in the case of amorphous resin) of usually 100 to 270° C. preferably 120 to 250° C. particularly preferably 150 to 230° C.

Examples of such thermoplastic resin include polyolefin-based resin, modified polyolefin-based resin which is graft modified with unsaturated carboxylic acid, polyester-based resin, polyvinyl chloride-based resin, thermoplastic polyurethane-based resin, polyvinylidene chloride, acryl-based resin, polystyrene-based resin, vinyl ester-based resin, polyester elastomer, polyurethane elastomer, chlorinated polyethylene, chlorinated polypropylene, and aromatic or aliphatic polyketone. Examples of the polyolefin-based resin include linear low density polyethylene, low density polyethylene, medium density polyethylene, high density polyethylene, ethylene-vinyl acetate copolymer, ionomer, ethylene-propylene copolymer, ethylene-acrylate copolymer, polypropylene, propylene-α-olefin (having from 4 to 20 carbon atoms) copolymer, polybutene, and polypentene. These thermoplastic resins may be used alone or in combination thereof.

Vinyl alcohol-based resin such as EVOH-based resin tends to be lowered in gas barrier property due to moisture, and therefore the vinyl alcohol-based resin generally a multilayer structure which comprises a surface layer of hydrophobicity thermoplastic resin such as polyolefin-based resin, polystyrene-based resin, and polyester-based resin, and optionally adhesive resin layer of unsaturated carboxylic acid-modified polyolefin-based resin or the like as an interlayer. The multilayer structure may be used as a wrapping material and so on. Scraps generated in the production of the multilayer structure can be retrieved to use as a recycled resin, which can be remolten and molded with an extruder.

The recycled resin is a mixture of constituent resins, that is to say, the recycled resin contains vinyl alcohol-based resin, hydrophobicity thermoplastic resin, and adhesive resin. Since the recycled resin contains polar group-containing thermoplastic resin, the purging agent of the invention is useful for purging an extruder used for extruding the recycled resin.

The resin which is removed or cleaned with use of the purging agent of the invention may contain not only aforementioned thermoplastic resin but also an additive which is commonly added to thermoplastic resin. Examples of the additive include thermal stabilizer, antioxidant, antistatic agent, colorant, ultraviolet absorber, lubricant, metal oxide (e.g. silicon oxide or titanium oxide commonly used as a pigment), plasticizer, light stabilizer, surfactant, insecticide, drying agent, antiblocking agent, fire retardant, crosslinking agent, curing agent, blowing agent, crystal forming agent, anti-fogging agent, biodegradable agent, silane coupling agent, oxygen scavenger, and so on.

If a purging operation with the purging agent is conducted for a polar group-containing thermoplastic resin, a metal salt contained in the purging agent transfers to the polar group-containing thermoplastic resin and decomposes it. Accordingly, the purging agent is useful for cleaning narrow and hot runner like a die or nozzle of molding apparatus, where the melt flow of the polar group-containing thermoplastic resin, especially EVOH-based resin, is likely to stagnate.

<Molding Apparatus to which the Purging Agent is Applied>

The purging agent of the invention is applied to a molding apparatus used for melt-molding process of the above-mentioned resin. The type of the molding apparatus is not particularly limited, and common extruders such as single screw extruder, twin screw extruder, or multi screw extruder can be applied to the purging operation with the purging agent. Non-limiting examples of the molding apparatus include monolayer cast extruder, monolayer inflation extruder, monolayer blowing extruder, injection molding apparatus, multilayer cast extruder, multilayer inflation extruder, multilayer blowing extruder, coinjection molding apparatus, and the like.

<Purging Operation>

The purging operation with use of the purging agent of the invention may be conducted in a conventionally known manner. Specifically, a molding apparatus after finishing a molding process of a resin is supplied or filled with a purging agent in order to remove the resin. After purging the molding apparatus of the resin, the purging agent starts to discharge from the apparatus.

A temperature of the molding apparatus (for example, temperature of a barrel in the case of extruder) when melt-molding a resin (hereinafter, referred to as "preceding resin") is normally in the range of usually 150 to 260° C.

A temperature of molding apparatus (for example, temperature of a barrel in the case of extruder) when filling the purging agent is supplied thereto is in the range of usually 180 to 280° C., preferably 200 to 260° C. more preferably 210 to 260° C. particularly preferably 230 to 260° C. If the temperature is unduly high, the viscosity of the purging agent is decreased to lower the purging performance, resulting in insufficient removal of the preceding resin from the apparatus. On the other hand, if the temperature is unduly low, the purging agent becomes hard to be ejected.

With respect to a temperature of the molding apparatus in melt molding process of the preceding resin or in supplying a purging agent, in the case of using an extruder as the molding apparatus, a temperature (surface temperature) of barrel of the extruder may be employed. In the case that the barrel of the extruder is divided into two or more sections each of which is set at an individual temperature, a highest temperature among temperatures of the sections is employed as the barrel temperature.

The amount of the purging agent filled in the molding apparatus usually varies depending on size of the apparatus and amount of contaminant. The normal amount of the purging agent is selected from the range of 5 to 100 times, preferably 8 to 50 times, particularly preferably 10 to 30 times amount of the capacity of the molding apparatus, from the viewpoint of handleability and economic advantage. The capacity of the molding apparatus is a volume filled with resin and corresponds to the volume of the barrel one subtracted by screw one.

In the case of an extruder, screw rotation speed of the extruder in the purging operation may be the same one employed in molding process of the preceding resin due to convenience. The screw rotation speed is selected from the range of usually 5 to 300 rpm, preferably 10 to 250 rpm, more preferably 10 to 100 rpm, due to practicality. Improvement of purging performance (removal efficiency of the resin) may be expected by periodically increasing and decreasing rotation speed of the screw rotation during purging operation.

In such purging operation, the metal salt contained in the purging agent of the invention may transfer into the preceding resin and decompose it. The decomposition of the resin may clean out the region which is narrow and hot run passageway, even a harsh area like a die or nozzle of molding apparatus. This is excellent purging performance.

Although the purging agent of the invention has a high content of the metal salt, generation of aggregate is suppressed because of low water content in the purging agent. Accordingly, excellent purging performance can be expected even in the harsh region which is narrow and hot run passageway like a die or nozzle of molding apparatus.

EXAMPLE

The present invention will be specifically described with examples below, however, the invention is not limited to the following examples unless exceeding the gist.

The term "parts" in the example is on the basis of weight.
[Evaluation Method of the Purging Agent]
(1) Resin to be Removed or Cleaned EVOH-based resin having ethylene content of 44 mol %, saponification degree of 99.8 mol %, and MFR of 3.5 g/10 min. (210° C., load of 2160 g) was used for a resin to be removed or cleaned.
(2-1) Purging Operation and Evaluation Method A A single screw extruder whose conditions were set as shown below was used for a continuous film production of the EVOH-based resin for 30 minutes.
  screw type: fulflight
  screw diameter: 40 mmφ
  L/D ratio: 28
  screw compression ratio: 2.5
  die: coathanger die
  extruder temperature: C1/C2C3/C4/H/D=180/190/200/210/210/210° C.
  rotational speed: 20 rpm After the production of film of EVOH-based resin (preceding resin), feeding a purging agent to an extruder was continued for 20 minutes at a fixed temperature of the extruder. After this purging operation, feeding another EVOH-based resin to the extruder was succeeded for the continuous film production for 30 minutes. During the film production of the succeeding resin, visual observation on whether aggregate came out in the produced film of the succeeding resin was made at the position having a distance of 1 m from the extruder.
(2-2) Purging Operation and Evaluation Method B A single screw extruder whose type is described below. The film production of the EVOH-based resin having thickness of 20 μm was continued for 30 minutes under the following conditions of the extruder and die.
  screw type: fulflight
  screw diameter: 40 mmφ
  die: coathanger die
  extruder temperature: C1/C2/C3/C4/H/AD/D1/D2/D3=180/190/200/210/210/210/210/210° C.
  rotational speed: 20 rpm
  roll temperature: 30° C.

15 minutes after starting the film production of EVOH-based resin, a film sample having a length of 1 m was obtained by cutting the produced film, and the number of aggregates in the sample film was counted.
<Measurement of Water Content>

A purging agent (weight: P1-10 g) was put in an aluminum cup (weight: C1). The weight (C1+P1) of aluminum cup containing the purging agent was weighed. The aluminum cup containing purging agent was heated at 105° C. for 2 hours in a desiccator "SAFETY OVEN SPH-100" (ESPEC CORP.). The desiccator was used without replacing air with nitrogen and vacuuming. After the heat treatment, the aluminum cup was taken out from the desiccator and then left to stand for 30 minutes in another desiccator where desiccant agent was set, as a result, the purging agent was cooled down to the room temperature. The aluminum cup which contains heat-treated purging agent (weight: P2) has a weight represented by (C1-P2), which was weighed. The water content (% by weight) was calculated according to the following formula with the obtained weight (C1+P2).

$$\text{Water content}(\% \text{ by weight}) = \frac{(C1+P1)-(C1+P2)}{(C1+P1)-C1} \times 100 = \frac{P1-P2}{P1} \times 100 \qquad \text{[Formula 1]}$$

<Preparation of Purging Agent Nos. 1 to 5 and their Evaluation>
Purging Agent No. 1

90 parts of linear low density polyethylene (Japan Polyethylene Corporation "Novatec® LL UF230") having MFR of 1.0 g/10 min. (190° C., load of 2160 g) and density of 0.92 g/cm$^3$ as a base resin, 5 parts of magnesium stearate having melting point of 125° C. (NOF Corporation), and 5 parts of basic magnesium carbonate having water content of 1.8% by weight (Konoshima Chemical Co. Ltd., Gold Star) were dry blended to prepare a purging agent. The magnesium stearate and the basic magnesium carbonate were used as a metal salt. The content of the metal salt in the purging agent was 10% by weight, and the content of the metal salt per 100 parts of the base resin (hydrocarbon-based resin) was 1.5 parts as an amount of metal.

Thus prepared dry blended matter was melt-kneaded with a twin screw extruder and extruded in strand-form. Thus obtained strand was water-cooled and cut with a pelletizer to produce pellets.
  screw diameter: 44 mmφ
  extruder temperature: C2/C3/C4/C5/C6/C7C8/C9 . . . C15/D=100/100/160/240/240/240/230/220 . . . 220/220° C.
  discharge amount: 160 kg/h
  rotational speed: 420 rpm
  water cooling distance: 2160 mm The water content in thus produced pellets of the purging agent No. 1 was 0.12% by weight.
Purging Agent Nos. 2 and 3

Water cooling distances in the pelletizing process of purging agent Nos. 2 and 3 was changed to 2100 mm and 3300 mm respectively, thereby producing the purging agents Nos. 2 and 3 each having a different water content from that of purging agent No. 1.
Purging Agent No. 4

Purging agent No. 4, which has relatively high water content, was produced by employing basic magnesium carbonate having water content of 2.2% by weight (Konoshima Chemical Co. Ltd., Gold Star).
Purging Agent No. 5

Purging agent No. 5 was produced by keeping the purging agent No. 1 in a constant temperature bath set at 40° C. and 90% RH for 1 day. Thus produced purging agent No. 5 had an increased water content of 0.26% by weight due to absorption of moisture during being kept in the bath.

Thus produced pellets of purging agent Nos. 1 to 5 were evaluated according to the evaluation method A. The evaluation results are shown in Table 1.

TABLE 1

| No | Composition (weight ratio) Resin:StMg:MgCO$_3$ | Mg content per resin (% by weight) | Method for adjusting water content | Water content of pellet (% by weight) | Observation of the presence of aggregate |
|---|---|---|---|---|---|
| 1 | 90:5:5 | 1.5 | Water cooling distance | 0.12 | absence |
| 2 | 90:5:5 | 1.5 | Water cooling distance | 0.10 | absence |
| 3 | 90:5:5 | 1.5 | Water cooling distance | 0.23 | presence |
| 4 | 90:5:5 | 1.5 | Water content of MgCO$_3$ | 0.25 | presence |
| 5 | 90:5:5 | 1.5 | Moisture absorption treatment | 0.26 | presence |

As seen from Table 1, even if the content of metal salt (Mg salt) per hydrocarbon as a base resin is the same, use of purging agents Nos. 1 and 2, each of which was reduced to 0.15% by weight or less in water content, could avoid contamination (aggregate) in the film of the succeeding resin.

[Preparation of Purging Agent Nos. 6 to 11 and Evaluation Thereof]

(1) Production of Non-Adjusted Pellets 90 parts of linear low density polyethylene having MFR of 0.6 g/10 min. (190° C. load of 2160 g) and density of 0.92 g/cm$^3$ (NUC Corporation "GS650") as a base resin, and 5 parts of magnesium stearate having a melting point of 120° C. (Sakai Chemical Industry Co., Ltd.), and 5 parts of basic magnesium carbonate having a water content of 1.9% by weight (Kyowa Chemical Industry Co. Ltd.) were dry blended. The dry blended matter was pelletized in the same manner as No. 1 to produce pellet, which was called as "non-adjusted pellet".

(2) Method for Adjusting Water Content a) Moisture Absorption Treatment (Before Blending)

The non-adjusted pellet was increased in water content by moisture absorption treatment conducted by being kept in a bath being set at 40° C. and 90% RH for 1 day.

b) Misting with Water after Blending

A dry blended matter having an adjusted metal content was misted with water, thereby obtaining a pellet with an increased water content.

c) Drying Method (Drying after Blending)

A dry blended matter having an adjusted metal content was dried at 90° C. for 3 hours to reduce its water content.

(3) Preparation of Purging Agent Nos. 6 to 11 and Evaluation Thereof

Purging Agent No. 6

The water content of the non-adjusted pellet produced in (1) was increased by the moisture absorption treatment a). Thus obtained pellet with an increased water content was mixed with linear low density polyethylene as a base resin to obtain the pellet of purging agent No. 6 having the content of metal salt per base resin as shown in Table 2

Purging Agent Nos. 8 and 10

The water content of the non-adjusted pellet produced in (1) was increased by moisture absorption treatment a). Thus obtained pellet with an increased water content are dry blended with linear low density polyethylene as a base resin at a given ratio to obtain a dry blended matter having the content of metal salt per base resin as shown in Table 2. The obtained dry blended matter was misted with water according to the method b) and thereafter pelletized to produce pellets of purging agent Nos. 8 and 10 each having an increased water content.

Purging Agent Nos. 7 and 9

The non-adjusted pellet produced in (1) and linear low density polyethylene as a base resin were dry blended to obtain a dry blended matter having the content of metal salt per base resin as shown in Table 2. The obtained dry blended matter was dried according to the method c) and thereafter being pelletized to produce pellets of purging agent Nos. 7 and 9 each having a decreased water content.

Purging Agent No. 11

The non-adjusted pellets produced in (1) and linear low density polyethylene as a base resin were dry blended to obtain a dry blended matter having the content of metal salt per base resin as shown in Table 2. The obtained dry blended matter was pelletized to produce pellet of purging agent No. 11.

Thus produced pellets of purging agent Nos. 6 to 11 were evaluated according to the evaluation method B. The evaluation results are shown in Table 2.

TABLE 2

| No | Composition (weight ratio) resin:StMg:MgCO$_3$ | Mg content per resin (% by weight) | Method for adjusting water content and metal content | Water content of pellet (% by weight) | Number of aggregate (number/m) |
|---|---|---|---|---|---|
| 6 | 92:4:4 | 1.2 | Moisture absorption treatment + dry blend | 0.27 | 47 |
| 7 | 92:4:4 | 1.2 | Dry blend + drying | 0.11 | 2 |
| 8 | 98:1:1 | 0.3 | Moisture absorption treatment + dry blend + misting | 0.21 | 20 |
| 9 | 98:1:1 | 0.3 | Dry blend + drying | 0.10 | 3 |
| 10 | 99:0.5:0.5 | 0.15 | Moisture absorption treatment + dry blend + misting | 0.28 | 9 |
| 11 | 99:0.5:0.5 | 0.15 | Dry blend | 0.10 | 1 |

It is understood from Table 2 that by the use of pellets of purging agent with metal content of 0.1 to 20% by weight per 100 parts of base resin and adjusted water content of 0.15% by weight or less, the contamination (generation of aggregate) was suppressed.

In particular, the purging agent having a relatively high content of the metal salt with the reduced water content of 0.15% by weight or less can remarkably suppress the generation of aggregate.

INDUSTRIAL APPLICABILITY

The purging agent of the invention can suppress the contamination in the resin after the purging operation. The excellent purging performance can be observed in the case of a polar group-containing resin such as EVOH-based resin, which is often used as a wrapping material, or a resin mixture, for example, obtained from a recycled resin. These resins are easily contaminated in melt molding process, however, purging operation with the purging agent of the invention can suppress the generation of aggregate. Accordingly, the purging agent is extremely useful in industry.

The invention claimed is:

1. A purging agent comprising
a hydrocarbon-based resin, and at least one metal salt selected from the group consisting of alkaline metal salt and alkaline earth metal salt,
wherein the purging agent has a water content of 0.15% by weight or less,
wherein a content of the metal salt is in the range of 0.1 to 20% in terms of the weight of metal relative to the hydrocarbon-based resin, and
wherein a resin to be processed in purging operation with the purging agent contains a polar group-containing thermoplastic resin,
wherein the metal salt comprises an inorganic salt and an organic salt.

2. The purging agent according to claim 1, wherein the ratio in weight of the inorganic salt to the organic salt, inorganic salt/organic salt, is in the range of 0.05 to 10.

3. The purging agent according to claim 1, wherein the organic salt is a metal salt of carboxylic acid of 10 to 25 carbon atoms.

4. The purging agent according to claim 1, wherein the inorganic salt is a carbonate.

5. The purging agent according to claim 1, wherein the polar group-containing thermoplastic resin is saponified ethylene-vinyl ester-based copolymer resin.

6. The purging agent according to claim 1, being in pellet form.

7. A method of purging a molding apparatus comprising
supplying a purging agent to the molding apparatus after finishing a molding process, and
discharging the purging agent from the molding apparatus,
wherein the purging agent comprises a hydrocarbon-based resin, and at least one metal salt selected from the group consisting of alkaline metal salt and alkaline earth metal salt, wherein the metal salt comprises an inorganic salt and an organic salt,
wherein the purging agent has a water content of 0.15% by weight or less,
wherein a content of the metal salt is in the range of 0.1 to 20% in terms of the weight of metal relative to the hydrocarbon-based resin, and
wherein a resin to be processed in purging operation with the purging agent contains a polar group-containing thermoplastic resin.

8. The method according to claim 7, wherein the temperature of the molding apparatus when supplying the purging agent is in the range of 180 to 280° C.

* * * * *